(12) United States Patent
Makino et al.

(10) Patent No.: US 7,957,778 B2
(45) Date of Patent: Jun. 7, 2011

(54) FOLDING PORTABLE COMMUNICATIONS DEVICE

(75) Inventors: Minoru Makino, Hiroshima (JP); Kimiaki Imai, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 709 days.

(21) Appl. No.: 11/826,936

(22) Filed: Jul. 19, 2007

(65) Prior Publication Data

US 2008/0026799 A1 Jan. 31, 2008

(30) Foreign Application Priority Data

Jul. 27, 2006 (JP) ................................. 2006-204253

(51) Int. Cl.
*H04M 1/00* (2006.01)

(52) U.S. Cl. .................. 455/575.3; 455/575.1; 455/566; 455/575.8

(58) Field of Classification Search ............... 455/575.3, 455/575.4
See application file for complete search history.

(56) References Cited

U.S. PATENT DOCUMENTS

| 5,124,975 | A | * | 6/1992 | Naoki et al. ................... 720/643 |
| 5,629,833 | A | | 5/1997 | Ido et al. |
| 7,082,028 | B2 | | 7/2006 | Huilgol et al. |
| 7,278,184 | B2 | * | 10/2007 | Kuramochi ..................... 16/357 |
| 2003/0013417 | A1 | | 1/2003 | Bum |
| 2003/0203747 | A1 | * | 10/2003 | Nagamine ................... 455/575.3 |
| 2005/0107137 | A1 | * | 5/2005 | Byun et al. .................. 455/575.1 |
| 2006/0172764 | A1 | * | 8/2006 | Makino ....................... 455/550.1 |
| 2007/0037618 | A1 | * | 2/2007 | Lee ............................. 455/575.4 |

FOREIGN PATENT DOCUMENTS

| EP | 0 703 401 B1 | 10/1999 |
| EP | 1 531 604 A2 | 5/2005 |
| EP | 1 542 433 A1 | 6/2005 |
| JP | 6-301341 A | 10/1994 |
| JP | 8-63259 A | 3/1996 |
| JP | 8-185242 A | 7/1996 |
| JP | 8-185243 A | 7/1996 |
| JP | 2001-156893 A | 6/2001 |
| JP | 2002-341998 A | 11/2002 |
| JP | 2003-114670 A | 4/2003 |
| JP | 2003-208241 A | 7/2003 |
| JP | 2003-319043 A | 11/2003 |
| JP | 2003-338866 A | 11/2003 |
| JP | 2006-19925 A | 1/2006 |
| WO | WO-2006/001661 A1 | 1/2006 |

* cited by examiner

*Primary Examiner* — Huy Phan
*Assistant Examiner* — Stamford Hwang
(74) *Attorney, Agent, or Firm* — Birch, Stewart, Kolasch & Birch, LLP

(57) ABSTRACT

A folding mobile phone (folding portable communications device) includes a first housing including a liquid crystal display part (display part) provided at a surface thereof, a second housing including an operating part provided at a surface thereof, and a hinge connecting the first and second housings to allow the first and second housings to be freely opened and closed in their folded form. A cam mechanism (support mechanism) supports the liquid crystal display part switchably between a vertical position and a horizontal position and to allow the liquid crystal display part to turn both clockwise and counterclockwise as viewed from the front.

10 Claims, 9 Drawing Sheets

FOLDING PORTABLE COMMUNICATIONS DEVICE

CROSS-REFERENCE TO RELATED APPLICATION

This application claims priority under 35 USC 119 to Japanese Patent Application No. 2006-204253 filed on Jul. 27, 2006, the entire contents of which are incorporated herein by reference.

BACKGROUND OF THE INVENTION (a) Field of the Invention

This invention relates to folding portable communications devices and particularly relates to those in which a display part is supported switchably between a vertical position and a transverse position.

(b) Description of the Related Art

A recent trend has been to use a folding mobile phone away from home to watch TV. Folding mobile phones generally have a longitudinally-extending display part. When the user watches TV on the longitudinally-extending display part, the size of the TV screen is very small as compared with the total display size. There have been conventional conflicting needs between making the folding mobile phone size as small as possible and watching TV on a large screen.

If the mobile phone itself is horizontally oriented and the screen is changed to a landscape mode, TV screen images can be displayed on the full display. To keep the display part of the mobile phone horizontally oriented, it is necessary to keep on holding the mobile phone, as turned 90 degrees into a horizontal position, with one hand or both hands or to stably keep the horizontally oriented folding mobile phone with a special holder. However, it is difficult to keep on holding the mobile phone in a fixed position with one hand or both hands and to find an appropriate holder away from home.

To cope with this, some techniques have been proposed that turn the display part, which is provided on an upper housing of the folding mobile phone, 90 degrees with respect to a lower housing thereof and allow the back face of the lower housing to rest on a place where the mobile phone is, thereby relatively stably putting the mobile phone on the place while allowing TV watching.

For example, Published Japanese Patent Application No. 2001-156893 discloses a folding portable communications device in which the display part is supported to a first housing switchably from vertical to horizontal position with the portable communications device itself held in a vertical position in hand. Specifically, the folding portable communications device has a pivot pin provided at the center of the display part and extending orthogonally to the display part, whereby the display part can be turned 90 degrees about the pivot pin.

Published Japanese Patent Application No. 2003-114670 discloses a portable communications device including: a first casing having a large number of input keys; a second casing having a display part capable of displaying letters and images; a connection member having one end hinge-jointed to the first casing foldably together and the other end connected in contacting relation to one region of the second casing; a pivotally actuating means, disposed between the one region of the second casing and the other end of the connection member, for pivotally moving the second casing along the contact surface with the connection member within a predetermined range of angles; and a signal processor for converting an image displayed on the display part when the second casing is pivotally moved by the pivotally actuating means. According to the portable communications device, the display part can change its position from vertical to horizontal or vice versa and can also change its screen size.

Alternatively, a known folding portable communications device disclosed in Published Japanese Patent Application No. 2003-319043 has a support mechanism that supports a display part slidably and pivotably on a first housing. According to the folding portable communications device, the display part is first vertically slid and then moved pivotally about a pivot pin provided at the center of the display part. Therefore, the display part can accordingly avoid its contact with the hinge and a swelled part provided at the lower end of the first housing and thereby increase the display size.

In all of the above known techniques, a mechanism for turning the display part is provided on the back face so that the display part can be turned from vertical to horizontal position in a single direction. Thus, the display can be oriented vertically and horizontally and the image size to be displayed can be changed.

However, as can be expected, whether the direction to provide ease of turning operation of the display part is clockwise or counterclockwise as viewed from the front depends upon whether the user is right-handed or left-handed. Furthermore, it can be expected that which direction provides ease of turning operation of the display part depends also upon whether the user holds the portable communications device in the right hand or the left hand.

SUMMARY OF THE INVENTION

The present invention has been made in view of the foregoing points and, therefore, its object is to provide a folding portable communications device that can turn the display part from vertical to horizontal position both clockwise and counterclockwise as viewed from the front while maintaining the display screen in a large size.

To attain the above object, the folding portable communications device according to the present invention employs a cam mechanism to support the display part pivotally movably from vertical to horizontal position both clockwise and counterclockwise as viewed from the front.

Specifically, a first aspect of the present invention is directed to a folding portable communications device including: a first housing including a display part provided at a surface thereof; a second housing including an operating part provided at a surface thereof; and a hinge connecting the first and second housings to allow the first and second housings to be freely opened and closed in their folded form; the display part being supported to the first housing through a support mechanism switchably between a vertical position and a horizontal position. Furthermore, the support mechanism comprises a cam mechanism, and the cam mechanism supports the display part to allow the display part to turn both clockwise and counterclockwise as viewed from the front.

With this configuration, since the cam mechanism supports the display part to the first housing to allow the display part to turn both clockwise and counterclockwise as viewed from the front, the display part of the folding portable communications device can be turned in a user's desired direction to its vertical or horizontal position. Furthermore, the path of the display part can be appropriately controlled by the cam mechanism. Therefore, even when the display is maintained in a large size, the display part can be prevented from being in contact with the hinge and the swelled part at the lower end of the first housing.

In a second aspect of the invention, the cam mechanism is configured to guide and support the display part to allow the display part to switch between the vertical position and the horizontal position so that a lower right corner of the display part moves along the hinge when the display part is switched in position while turning clockwise as viewed from the front and that a lower left corner of the display part moves along the hinge when the display part is switched in position while turning counterclockwise as viewed from the front.

With this configuration, the display part is guided and supported in both clockwise turning and counterclockwise turning by the cam mechanism so that the lower right or left corner moves along the hinge. Thus, the display part moves keeping a distance from the hinge. Therefore, even if the lower end of the display part is not rounded along a semicircle having the radius around the pivot pin for the display part as would otherwise conventionally be done, the display part does not come into contact with the hinge and the swelled part at the lower end of the first housing.

In a third aspect of the invention, the lateral middles of the display part in the vertical and horizontal positions are each located substantially in the lateral middle of the first housing.

Suppose that, like the known technique, the display part is provided at the center with a pivot pin supporting the display part to the first housing. In such a case, in order that the lateral middle of the display part in horizontal position is located substantially in the lateral middle of the first housing, the upper side of the display part in vertical position needs to be reduced in height according to the lower side thereof reduced in height, which makes the entire size of the display part smaller. According to the present invention, however, in changing the display part into the vertical or horizontal position, the display part can be guided by the cam mechanism to avoid contact with the hinge and the swelled part at the lower end of the first housing and the cam mechanism eliminates the need to provide the pivot pin at the center of the display part unlike the known technique. Therefore, without the need to reduce the height of the upper side of the display part in vertical position, the display part is located in the lateral middle of the first housing not only in the vertical position but also in the horizontal position. As a result, the display part is located in the lateral middle with respect to the operating part.

In a fourth aspect of the invention, the cam mechanism includes a first guide groove formed in the first housing and including continuous left and right sections, a second guide groove formed in the first housing away from the first guide groove, a first guide pin disposed on the back face of the display part to slidingly engage in the first guide groove, and a second guide pin disposed on the back face of the display part to slidingly engage in the second guide groove.

With this configuration, in changing the display part from vertical to horizontal position by turning it clockwise as viewed from the front, the cam mechanism allows the first guide pin to slide leftward and towards the upper end of the left section of the first guide groove in engaged relation with the first guide groove and concurrently allows the second guide pin to slide downward in engaged relation with the second guide groove. On the other hand, in changing the display part from vertical to horizontal position by turning it counterclockwise as viewed from the front, the cam mechanism allows the first guide pin to slide rightward and towards the upper end of the right section of the first guide groove in engaged relation with the first guide groove and concurrently allows the second guide pin to slide downward in engaged relation with the second guide groove. Thus, the display part can be changed into the vertical or horizontal position while its movement is restricted to avoid contact with the hinge and the swelled part at the lower end of the first housing by the cam mechanism.

In a fifth aspect of the invention, the cam mechanism includes a resilient member fixed at one end to the first guide pin, fixed at the other end to the first housing and urging the display part into at lease one of the vertical and horizontal positions.

With this configuration, depending upon the way of applying the urging force of the resilient member to the display part, the resilient member can assist, in both clockwise turning and counterclockwise turning of the display part, the position change of the display part in a single direction from vertical to horizontal position, in a single direction from horizontal to vertical position or in both the directions.

In a sixth aspect of the invention, the resilient member includes: a first resilient member acting on the first guide groove when the first guide pin is in the left section of the first guide groove; and a second resilient member acting on the first guide groove when the first guide pin is in the right section of the first guide groove.

With this configuration, the two resilient members urge the display part both in clockwise turning and counterclockwise turning as viewed from the front, which facilitates the position change of the display part.

In a seventh aspect of the invention, the resilient members are torsion coil springs.

In this case, resilient members have a simple and nonbreakable structure.

In an eighth aspect of the invention, one ends of the first and second resilient members towards the first guide pin are formed in a substantially U-shape.

With this configuration, the first guide pin can be passed from the first resilient member to the second resilient member or from the second resilient member to the first resilient member at the transition between when the first guide pin is in the left section of the first guide groove and when it is in the right section of the first guide groove.

In a ninth aspect of the invention, the second guide groove extends in a direction inclining with respect to the axis of the hinge. In a tenth aspect of the invention, the second guide groove extends substantially orthogonally to the axis of the hinge. In an eleventh aspect of the invention, the second guide groove has a curved shape.

With these configurations, desired movement of the display part can be attained by adjusting the shape of the first guide groove according to the shape of the second guide groove.

In a twelfth aspect of the invention, the folding portable communications device is configured to be put on a place with the first housing opened from the second housing and the second housing resting on the place whether the display part is in the vertical position or in the horizontal position.

With this configuration, even away from home, the user can watch TV or the like on the display part in horizontal position without using any supporting means for supporting the folding portable communications device.

In a thirteenth aspect of the invention, the folding portable communications device is a mobile phone.

Thus, in a multi-function, frequently-used mobile phone, the display part can easily be changed into the horizontal or vertical position.

DETAILED DESCRIPTION OF THE INVENTION

Hereinafter, an embodiment of the present invention will be described with reference to the drawings.

Figure 1:
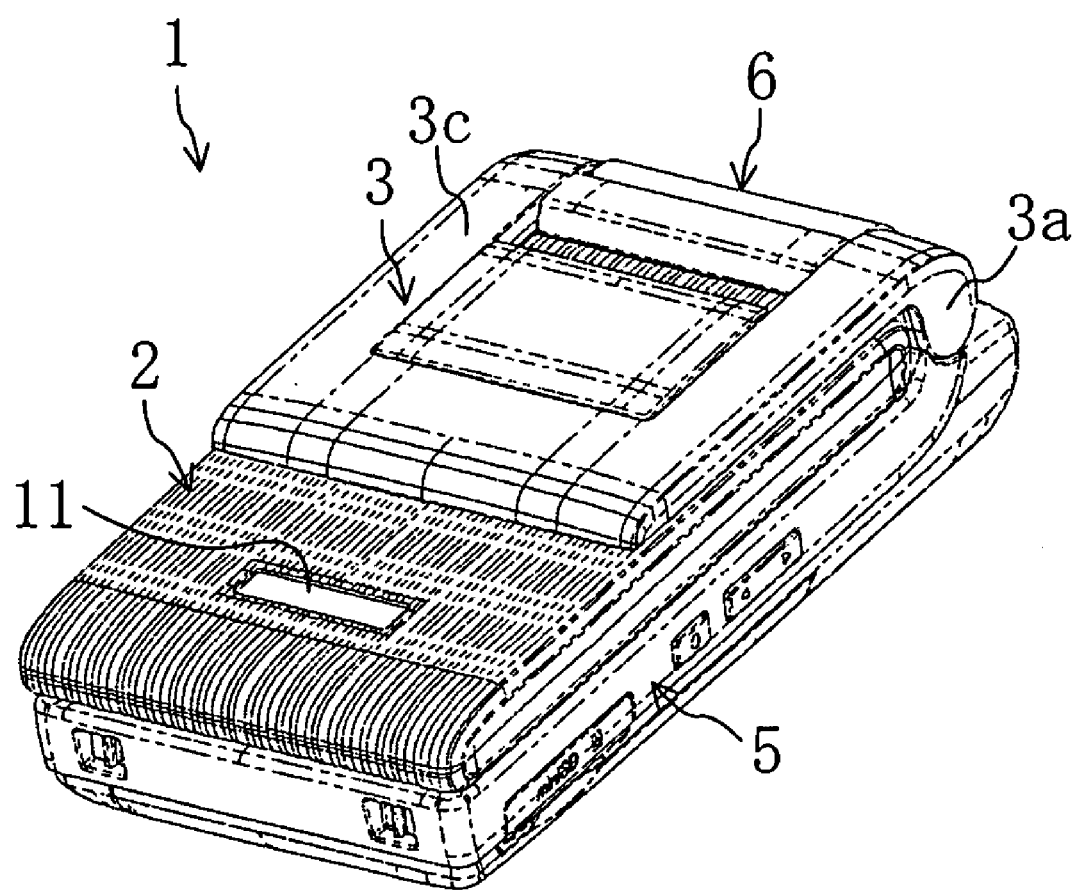
FIG. 1 is a perspective view showing a folding mobile phone according to an embodiment of the present invention, in which the mobile phone is in a folded state.
Figure 2:
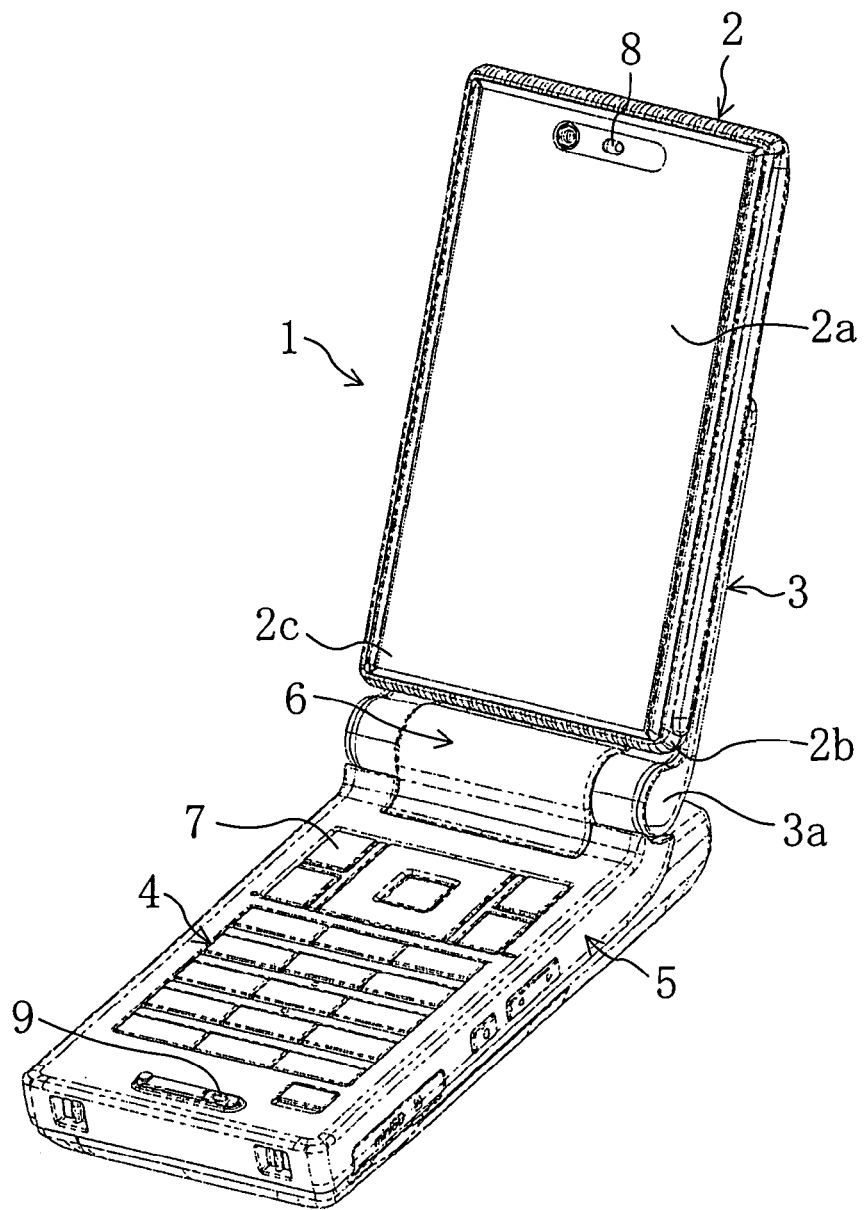
FIG. 2 is a perspective view showing the folding mobile phone in opened state in which its liquid crystal display part is in a vertical position.
Figure 3:
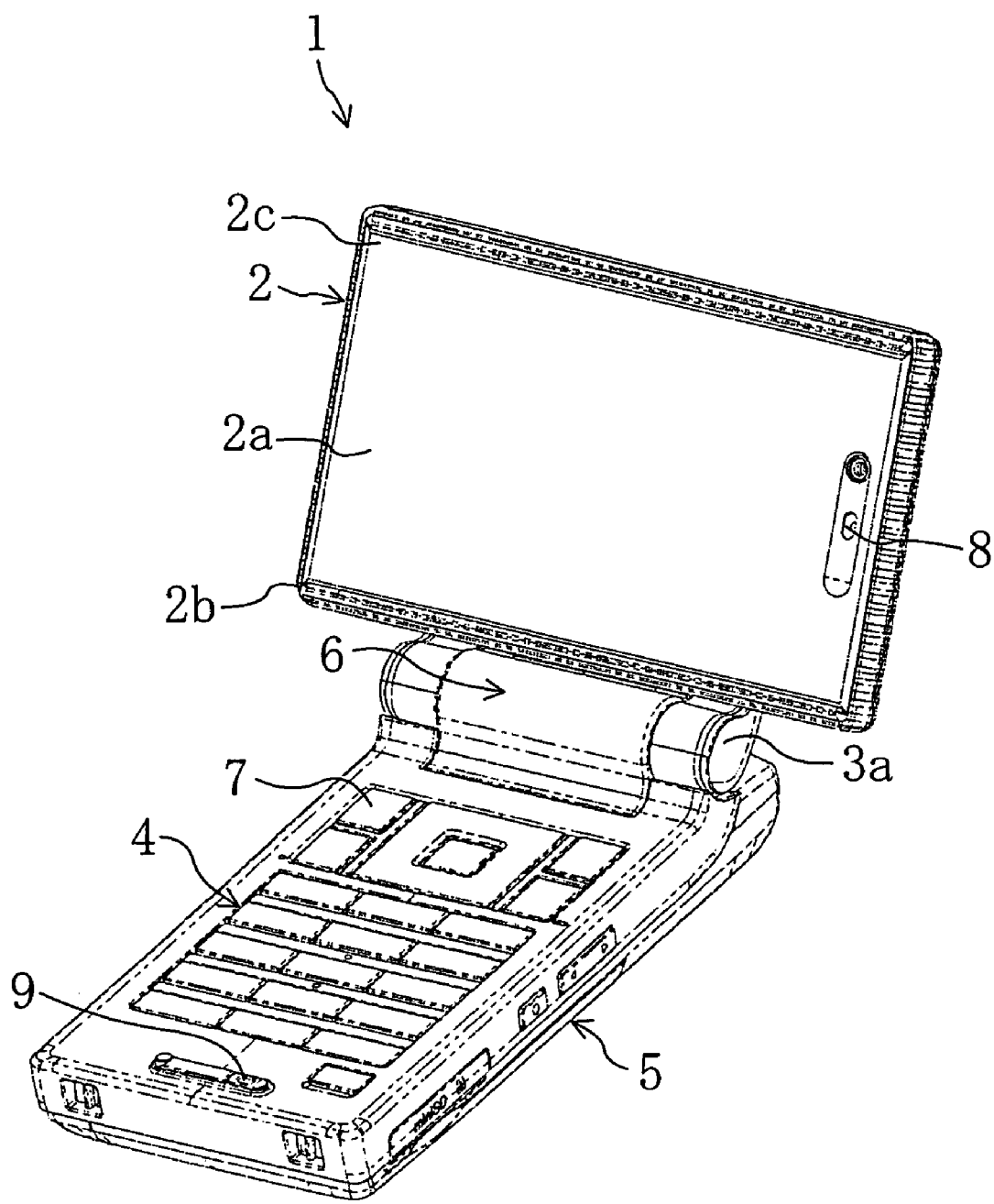
FIG. 3 is a perspective view showing the folding mobile phone in opened state in which the liquid crystal display part is in a horizontal position.
Figure 4:
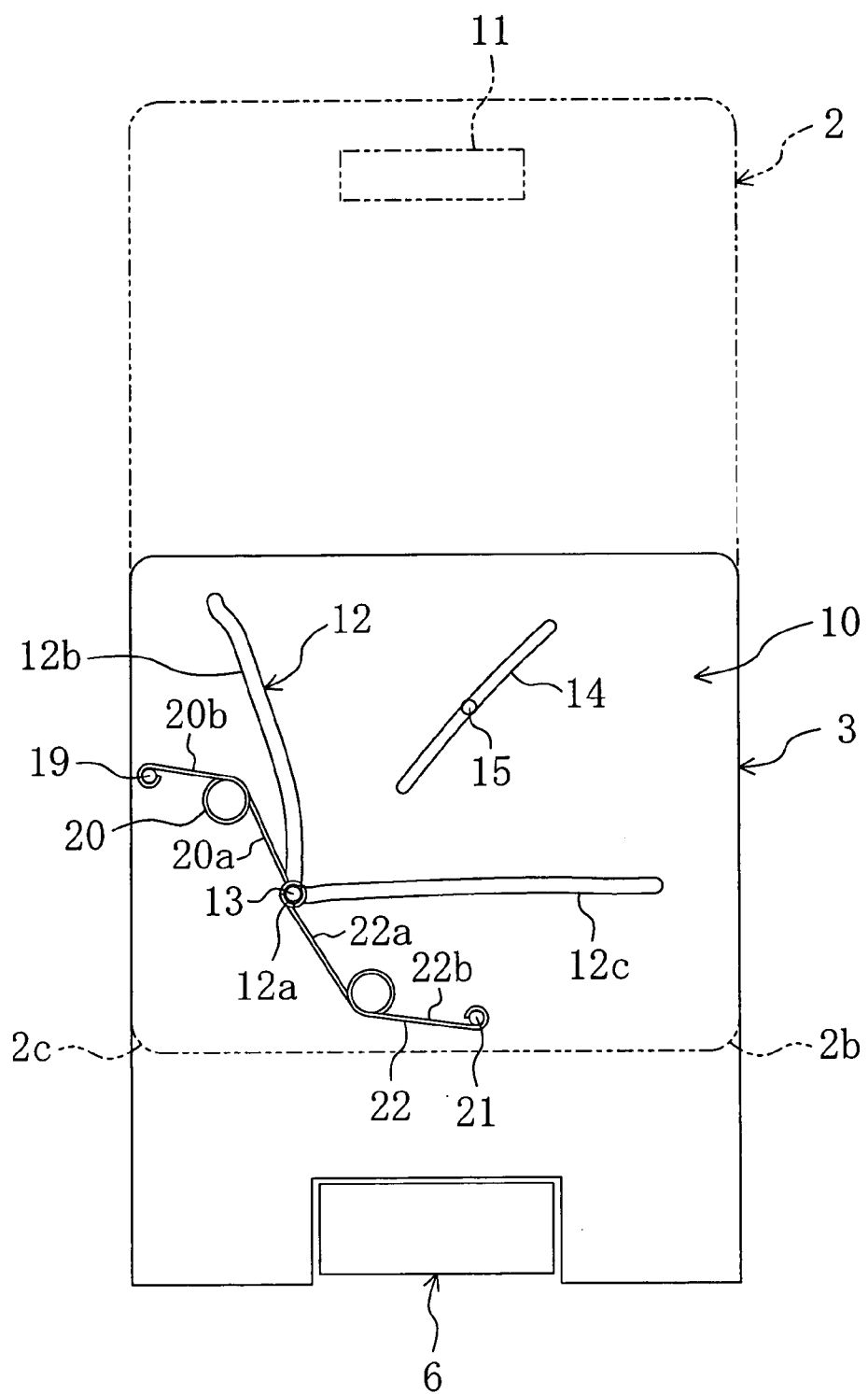
FIG. 4 is a front view schematically showing the liquid crystal display part, a first housing and a cam mechanism when the liquid crystal display part is in a vertical position.

FIG. 1 is a perspective view showing a folding mobile phone according to an embodiment of the present invention, in which the mobile phone is in a folded state. FIG. 2 is a perspective view showing the folding mobile phone in opened state in which its liquid crystal display part is in a vertical position. FIG. 3 is a perspective view showing the folding mobile phone in opened state in which the liquid crystal display part is in a horizontal position.

The folding mobile phone 1, which is a folding portable communications device according to an embodiment of the present invention, includes a first housing 3 provided at a surface thereof with a liquid crystal display part 2 as a display part, a second housing 5 having an operating part 4 at a surface thereof, and a hinge 6 connecting the first and second housings 3 and 5 to allow them to be freely opened and closed in their folded form. Thus, the folding mobile phone 1 can be switched between two states, a folded state shown in FIG. 1 and an opened state shown in FIGS. 2 and 3.

The operating part 4 of the second housing 5 is provided with a plurality of operation keys 7. These operation keys 7 are arranged to allow keystrokes when the user holds the entire folding mobile phone 1 in a vertical position and have marks put on their surfaces. Through the operation of these operation keys 7, the user can be offered various functions of the folding mobile phone 1. The second housing 5 is provided also with a microphone 9 for communications.

The liquid crystal display part 2 and the operating part 4 are configured to appear when the first housing 3 is opened from the position folded on the second housing 5. Therefore, with this configuration of the folding mobile phone 1, whether the liquid crystal display part 2 is in a vertical position or a horizontal position, the user can operate the operation keys 7 of the operating part 4 in vertical position while viewing a liquid crystal display 2a of the liquid crystal display part 2.

The liquid crystal display part 2 has a linear lower end as viewed in the vertical position and its liquid crystal display 2a is formed in a rectangular shape to occupy almost the whole of one surface of the liquid crystal display part 2. The liquid crystal display part 2 has a speaker 8 for communications provided at the upper end as viewed in the vertical position. The four corners of the liquid crystal display part 2 including lower right and left corners 2b and 2c are rounded in consideration of design or safety. The back face of the liquid crystal display part 2 is provided at an upper part thereof with a back liquid crystal display 11 for displaying mainly the time and sometimes other types of information. The user can see the time or other information with the mobile phone folded.

FIGS. 4 to 8 schematically show the first housing 3 as viewed from the front. The first housing 3 is provided with a cam mechanism 10 serving as a support mechanism for supporting the liquid crystal display part 2 in the shape of a substantially rectangular plate (shown in dash-double-dot lines) switchably between vertical and horizontal positions. The cam mechanism 10 includes a first guide groove 12 formed in the first housing 3 to bend in the middle, a linear second guide groove 14 formed in the first housing 3, a first guide pin 13 provided on the back face of the liquid crystal display part 2 to slidingly engage into the first guide groove 12, and a second guide pin 15 provided on the back face of the liquid crystal display part 2 to slidingly engage into the second guide groove 14.

For example, the first and second guide grooves 12 and 14 are formed in a guide plate (not shown) fixed on the first housing 3. The guide plate is made of sheet metal of, for example, stainless steel. If the first housing 3 is made of a metal formed part and the guide plate is attached to the first housing 3, the total thickness can be reduced. The first guide groove 12 is formed by the peripheral edge of a substantially V-shaped opening as the folding mobile phone 1 is viewed from the front. The first guide groove 12 is composed of a left section 12b extending to incline upwardly leftward from its central point 12a and a right section 12c extending substantially horizontally from the central point 12a. The central point 12a is located offset to the left from the center of the first housing 3. The second guide groove 14 is formed by the peripheral edge of a linear opening extending to incline upwardly rightward at approximately 45° from a point slightly upwardly rightward away from the central point 12a of the first guide groove 12. Thus, when the folding mobile phone 1 is in the vertical position, the second guide pin 15, which corresponds to the conventional pivot pin vertically extending with respect to the liquid crystal display part, is located at a point of the first housing 3 slightly upwardly rightward offset from the center as viewed from the front. Note that the shapes of the first and second guide grooves 12 and 14 are not limited to those in this embodiment.

On the other hand, the back face of the liquid crystal display part 2 has a metal link member (not shown) fitted thereon. The first guide pin 13 is provided on the link member to vertically extend from one end of the link member. The second guide pin 15 is also provided on the link member to vertically extend from the other end of the link member.

Figure 5:
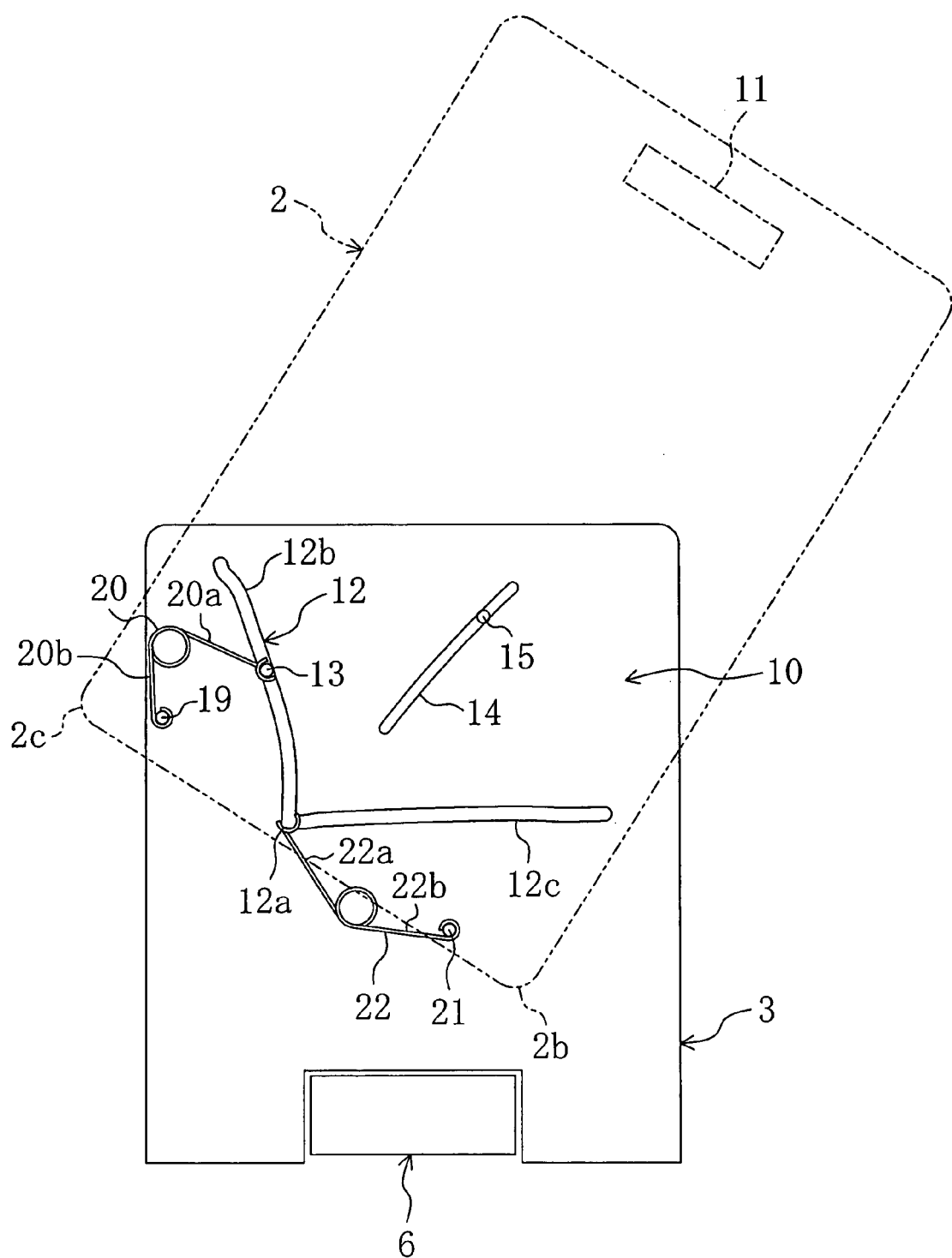
FIG. 5 is a corresponding view of FIG. 4, illustrating the state of the liquid crystal display part being turned clockwise from its vertical position.

The guide plate is provided at the vertical middle of the left part with a first spring retaining pin 19 vertically extending towards the liquid crystal display part 2. A first torsion coil spring 20 is retained as a first resilient member on the first spring retaining pin 19. One end 20a of the first torsion coil spring 20 is formed in a substantially U-shape whose opening is on the right side. The other end 20b thereof is formed in a substantially ring shape. The one end 20a is rotatably seated on the outer periphery of the first guide pin 13, while the other end 20b is rotatably seated on the outer periphery of the first spring retaining pin 19. Thus, the first torsion coil spring 20 is supported on the first spring retaining pin 19 to vertically swing about the first spring retaining pin 19. Furthermore, the first torsion coil spring 20 is placed so that its resilient force urges the liquid crystal display part 2 to change from vertical to horizontal position and change from horizontal to vertical position. Specifically, the first torsion coil spring 20 is placed to have the maximum flexure angle and be most compressed in the vicinity of the point where the first guide pin 13 is located closest to the first spring retaining pin 19 as shown in FIG. 5 (where the second guide pin 15 is located towards the upper end of the second guide groove 14). When the first guide pin 13 moves upward or downward from the closest point to the first spring retaining pin 19, the first torsion coil spring 20 urges the liquid crystal display part 2 into the vertical position or the horizontal position.

The guide plate is also provided at the center of the lower part with a second spring retaining pin 21 vertically extending towards the liquid crystal display part 2. A second torsion coil spring 22 is retained as a second resilient member on the second spring retaining pin 21. One end 22a of the second torsion coil spring 22 is formed in a substantially U-shape whose opening is on the upper side. The other end 22b thereof is formed in a substantially ring shape. The one end 22a is rotatably seated on the outer periphery of the first guide pin 13, while the other end 22b is rotatably seated on the outer periphery of the second spring retaining pin 21. Thus, the second torsion coil spring 22 is supported on the second spring retaining pin 21 to laterally swing about the second spring retaining pin 21. Furthermore, the second torsion coil spring 22 is placed so that its resilient force urges the liquid crystal display part 2 to change from vertical to horizontal position and change from horizontal to vertical position. Specifically, the second torsion coil spring 22 is placed to have the maximum flexure angle and be most compressed in the vicinity of the point where the first guide pin 13 moves further rightward from the point shown in FIG. 7 and is located closest to the second spring retaining pin 21 (where the second guide pin 15 is located at the upper end of the second guide groove 14). When the first guide pin 13 moves rightward or leftward from the closest point to the second spring retaining pin 21, the second torsion coil spring 22 urges the liquid crystal display part 2 into the vertical position or the horizontal position.

The first and second guide grooves 12 and 14, the first and second guide pins 13 and 15 and the first and second torsion coil springs 20 and 22 are formed to be capable of assembly in unit. The cam mechanism 10 thus assembled can be attached to the first housing 3 by attaching the guide plate to the first housing 3.

Operations

Next, a description is given of the behavior of the folding mobile phone 1 according to this embodiment.

First, when not in use or on standby, the folding mobile phone 1, as shown in FIG. 1, is folded by closing the first and second housings 3 and 5.

Then, when the first housing 3 and the liquid crystal display part 2 are opened from the second housing 5 as shown in FIG. 2, the liquid crystal display part 2 and the operating part 4 appear. In normal phone call and mail sending/receiving time, the folding mobile phone 1 is used by keystroking on the operating part 4 as the liquid crystal display part 2 is in the vertical position.

On the other hand, in viewing the screen in landscape mode, such as watching ground digital TV programs and creating and reading English mails, the user turns the liquid crystal display part 2 from the vertical position to the horizontal position.

First, a description is given of the method for turning the liquid crystal display part 2 clockwise. The user pushes the lower right corner 2b of the liquid crystal display part 2 in vertical position shown in FIG. 4 clockwise as viewed from the front. Thus, since one end 22a of the second torsion coil sprint 22 is formed in a substantially U-shape whose opening is on the upper side, as shown in FIG. 5, the first guide pin 13 slides out of the one end 22a, so that only the first torsion coil spring 20 moves together with the first guide pin 13 and the second torsion coil spring 22 is left as it is. At the time, the second guide pin 15 positioned in the middle of the second guide groove 14 as viewed from the front of the folding mobile phone 1 slightly moves up, while the first guide pin 13 positioned at the center 12a of the first guide groove 12 moves to the middle of the left section 12b.

Figure 6:
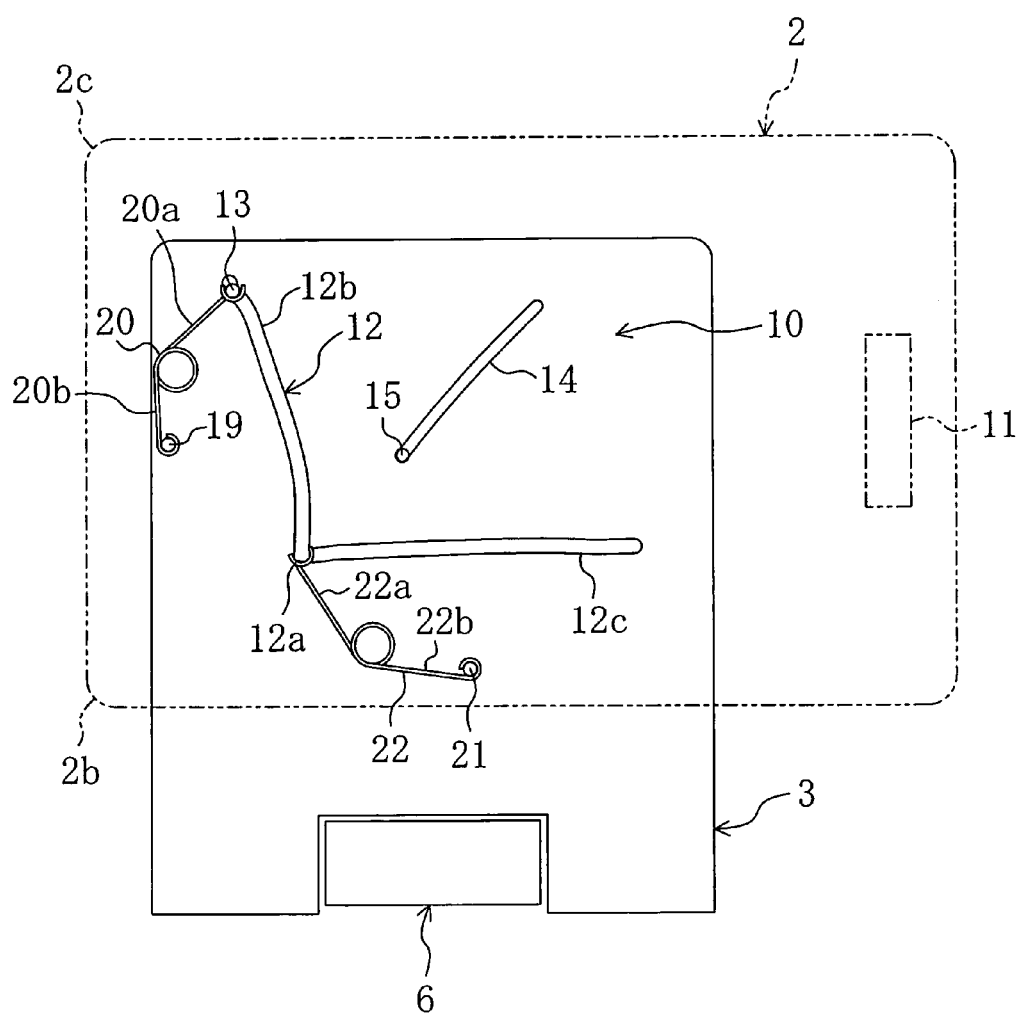
FIG. 6 is a corresponding view of FIG. 4, illustrating the horizontal position of the liquid crystal display part after turned clockwise from its vertical position.

Subsequently, when the user turns the liquid crystal display part 2 against the urging force of the first torsion coil spring 20 beyond the maximum flexure angle of the first torsion coil spring 20, the liquid crystal display part 2 is changed into the horizontal position shown in FIG. 6 while being assisted by the urging force of the first torsion soil spring 20. At the time, the second guide pin 15 positioned in the middle of the second guide groove 14 as viewed from the front of the folding mobile phone 1 moves to the lower end of the second guide groove 14, while the first guide pin 13 positioned in the middle of the left section 12b of the first guide groove 12 moves to the upper end of the left section 12b.

In this manner, the cam mechanism 10 allows the first guide pin 13 to slide from the center 12a of the first guide groove 12 to the upper end of the left section 12b thereof and concurrently allows the second guide pin 15 to vertically slide in the second guide groove 14. Thus, the liquid crystal display part 2 is turned clockwise to change its position from vertical to horizontal.

Figure 7:
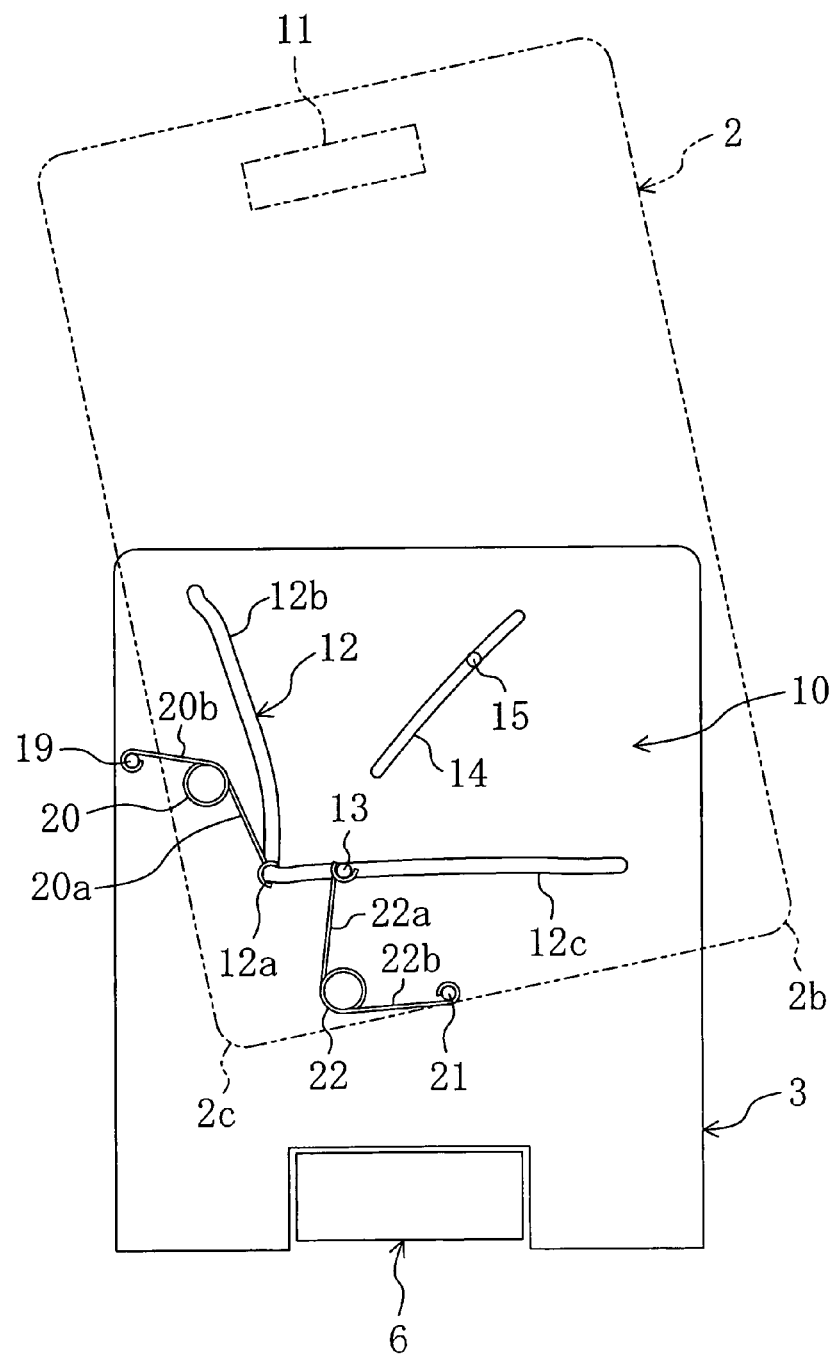
FIG. 7 is a corresponding view of FIG. 4, illustrating the state of the liquid crystal display part being turned counterclockwise from its vertical position.

Next, a description is given of the method for turning the liquid crystal display part 2 counterclockwise. The user pushes the lower left corner 2c of the liquid crystal display part 2 in vertical position shown in FIG. 4 counterclockwise as viewed from the front. Thus, since one end 20a of the first torsion coil sprint 20 is formed in a substantially U-shape whose opening is on the right side, as shown in FIG. 7, the first guide pin 13 slides out of the one end 20a, so that only the second torsion coil spring 22 moves together with the first guide pin 13 and the first torsion coil spring 20 is left as it is. At the time, the second guide pin 15 positioned in the middle of the second guide groove 14 as viewed from the front of the folding mobile phone 1 slightly moves up, while the first guide pin 13 positioned at the center 12a of the first guide groove 12 moves to the middle of the right section 12c.

Figure 8:
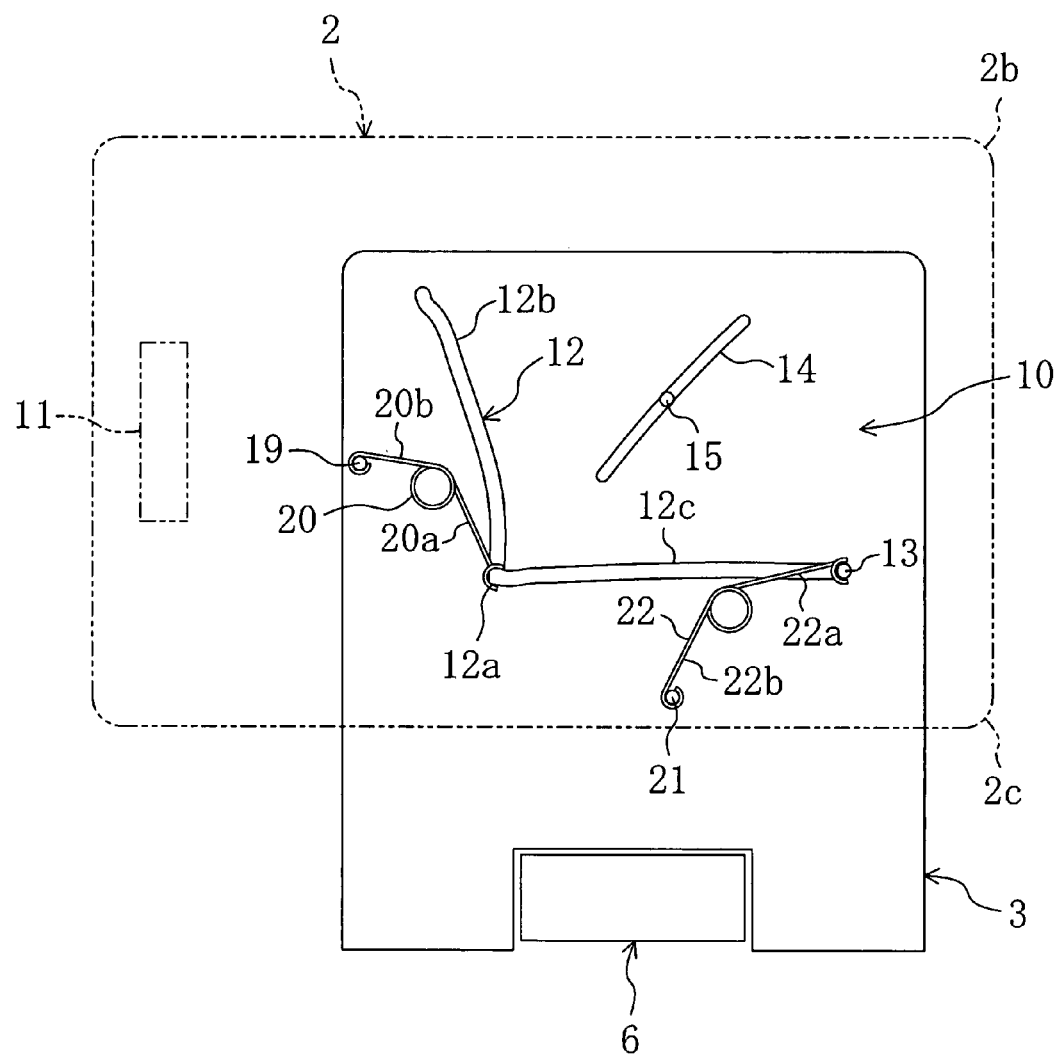
FIG. 8 is a corresponding view of FIG. 4, illustrating the horizontal position of the liquid crystal display part after turned counterclockwise from its vertical position.

Subsequently, when the user turns the liquid crystal display part 2 against the urging force of the second torsion coil spring 22 beyond the maximum flexure angle of the second torsion coil spring 22, the liquid crystal display part 2 is changed into the horizontal position shown in FIG. 8 while being assisted by the urging force of the second torsion soil spring 22. At the time, the second guide pin 15 positioned in the upper side of the second guide groove 14 as viewed from the front of the folding mobile phone 1 moves to the middle of the second guide groove 14, while the first guide pin 13 positioned in the middle of the right section 12c of the first guide groove 12 moves to the right end of the right section 12c.

In this manner, the cam mechanism 10 allows the first guide pin 13 to slide from the center 12a of the first guide groove 12 to the right end of the right section 12c thereof and concurrently allows the second guide pin 15 to vertically slide in the second guide groove 14. Thus, the liquid crystal display part 2 is turned counterclockwise to change its position from vertical to horizontal.

As can be seen from the above, the liquid crystal display part 2 is guided and supported both during clockwise turning and during counterclockwise turning so that the lowermost end of the lower right corner 2b or lower left corner 2c moves keeping a distance from the hinge 6. Therefore, the liquid crystal display part 2 can be prevented from being in contact with the hinge 6. Hence, even if the lower end of the liquid crystal display part 2 is not rounded along a semicircle having the radius around the pivot pin for the liquid crystal display part 2 as would otherwise conventionally be done, the liquid crystal display part 2 does not come into contact with the hinge 6.

Also in the horizontal position shown in FIG. 3, the lateral middle of the liquid crystal display part 2 is located substantially in the lateral middle of the first housing 3 (although in the figure the liquid crystal display part 2 is slightly laterally offset, it can be located substantially in the lateral middle by adjusting the first and second guide pins 12 and 14 and the shape of the liquid crystal display part 2 or other parts). The liquid crystal display part 2 is set, in this position, so that a landscape image can be largely displayed on the liquid crystal display 2a. Therefore, when the liquid crystal display part 2 is in the horizontal position, the user can enter a quiz program via TV and use TV shopping or remittance via TV while keystroking on the operating part 4. In other words, also when the liquid crystal display part 2 is in the horizontal position, the user can easily operate the operating part 4 in a familiar key arrangement of the vertical position while viewing the liquid crystal display 2a of the liquid crystal display part 2.

Furthermore, the folding mobile phone 1 can be put on a place with the first housing 3 opened from the second housing 5 and the second housing 5 resting on the place whether the liquid crystal display part 2 is in the horizontal position or the vertical position. Therefore, even away from home, the user can watch TV or the like on the liquid crystal display part 2 in horizontal position without using any supporting means for supporting the mobile phone 1.

After use, the user turns the lower right corner 2b or lower left corner 2c of the liquid crystal display part 2 against the urging force of the first torsion coil spring 20 or the second torsion coil spring 22 beyond the maximum flexure angle of the torsion coil spring in the opposite direction to the direction as described above. Thus, the liquid crystal display part 2 returns to the vertical position while being assisted by the urging force of the first torsion coil spring 20 or the second torsion coil spring 22.

Then, the first and second housings 3 and 5 are folded against each other, so that the phone mobile 1 is on standby.

Effects of Embodiment

As seen from the above, according to the folding mobile phone 1 according to this embodiment, the cam mechanism 10 supports the liquid crystal display part 2 pivotally both clockwise and counterclockwise as viewed from the front while controlling the path of the liquid crystal display part 2. Therefore, whether the user is left-handed or right-handed, he or she can turn the liquid crystal display part 2 in a desired direction to change its position from vertical to horizontal. Furthermore, whether the user holds the folding mobile phone 1 in the right hand or left hand, he or she can freely select the direction of turning the liquid crystal display part 2. Thus, while the liquid crystal display part 2 is maintained in a large screen size, it can be turned from the vertical position to the horizontal position both clockwise and counterclockwise as viewed from the front.

Furthermore, by means of the cam mechanism 10, the liquid crystal display part 2 is changed to the horizontal position or the vertical position in either turning direction, i.e., both clockwise and counterclockwise as viewed from the front, so that the lower right corner 2b or the lower left corner 2c moves along the hinge 6 while keeping a distance from the hinge 6. Therefore, even if the liquid crystal display part 2 has a substantially rectangular shape, it is prevented from being in contact with the hinge 6 and the swelled part at the lower end of the first housing 3, thereby providing a large display screen.

Furthermore, by means of the cam mechanism 10, the liquid crystal display part 2 is changed in position while preventing its contact with the other parts of the mobile phone 1 in either turning direction, i.e., both clockwise and counter clockwise as viewed from the front, so that the lateral middles of the liquid crystal display part 2 in both the vertical and horizontal positions are each located substantially in the lateral middle of the first housing 3. Therefore, the liquid crystal display part 2 can be located in the lateral middle of the entire folding mobile phone 1 not only in the vertical position but also in the horizontal position while providing a screen as large as possible. This provides a folding mobile phone 1 having a good appearance, ease of view and a good operability.

Furthermore, in either turning direction of the liquid crystal display part 2, i.e., both clockwise and counterclockwise as viewed from the front, the first guide pin 13 is slid as engaged in the first guide groove 12 and concurrently the second guide pin 15 is slid as engaged in the second guide groove 14. Thus, in both clockwise turning and counterclockwise turning as viewed from the front, the liquid crystal display part 2 can be changed into the vertical position or the horizontal position while its movement is restricted. Therefore, the liquid crystal display part 2 can be increased in size without increasing the entire size of the mobile phone 1 and can be easily and surely changed to the vertical position or the horizontal position with a simple structure while preventing its contact with the other parts of the mobile phone 1.

Furthermore, the cam mechanism 10 is provided with a first torsion coil spring 20 that urges the liquid crystal display part 2 into at least one of the vertical position or the horizontal position and configured to assist the position change with the first torsion coil spring 20. Therefore, the user can change the liquid crystal display part 2 to the vertical position or the horizontal position with his or her single hand through one-touch operation in either turning direction, i.e., both clockwise and counterclockwise as viewed from the front. This provides a folding mobile phone 1 having a still better operability.

Furthermore, used as the resilient member is a simple, nonbreakable first torsion coil spring 20 whose one end is fixed to the first guide pin 13 and whose other end is fixed to the first housing 3. This provides a low-cost, high-operability cam mechanism 10.

Furthermore, one ends 20a and 22a of the first and second resilient members 20 and 22 are formed in a substantially U-shape to allow the first guide pin 13 to be passed between the first and second resilient members 20 and 22. Therefore, the position change of the liquid crystal display part 2 can be assisted with a simple structure using the first and second resilient members 20 and 22 in either turning direction, i.e., both clockwise and counterclockwise as viewed from the front.

Furthermore, whether the liquid crystal display part 2 is in the horizontal position or the vertical position, the folding mobile phone 1 in opened state can be put on a place with the second housing 5 resting on the place. Therefore, the user can comfortably watch TV or the like with the mobile phone 1 put on a suitable place.

Furthermore, since in this embodiment the folding portable communications device is a folding mobile phone 1, this provides a high operability, compact, high commercial value mobile phone easily changeable into the horizontal or vertical position.

Other Embodiments

The folding portable communications device of the present invention may have the following configurations instead of the above embodiment.

Figure 9:
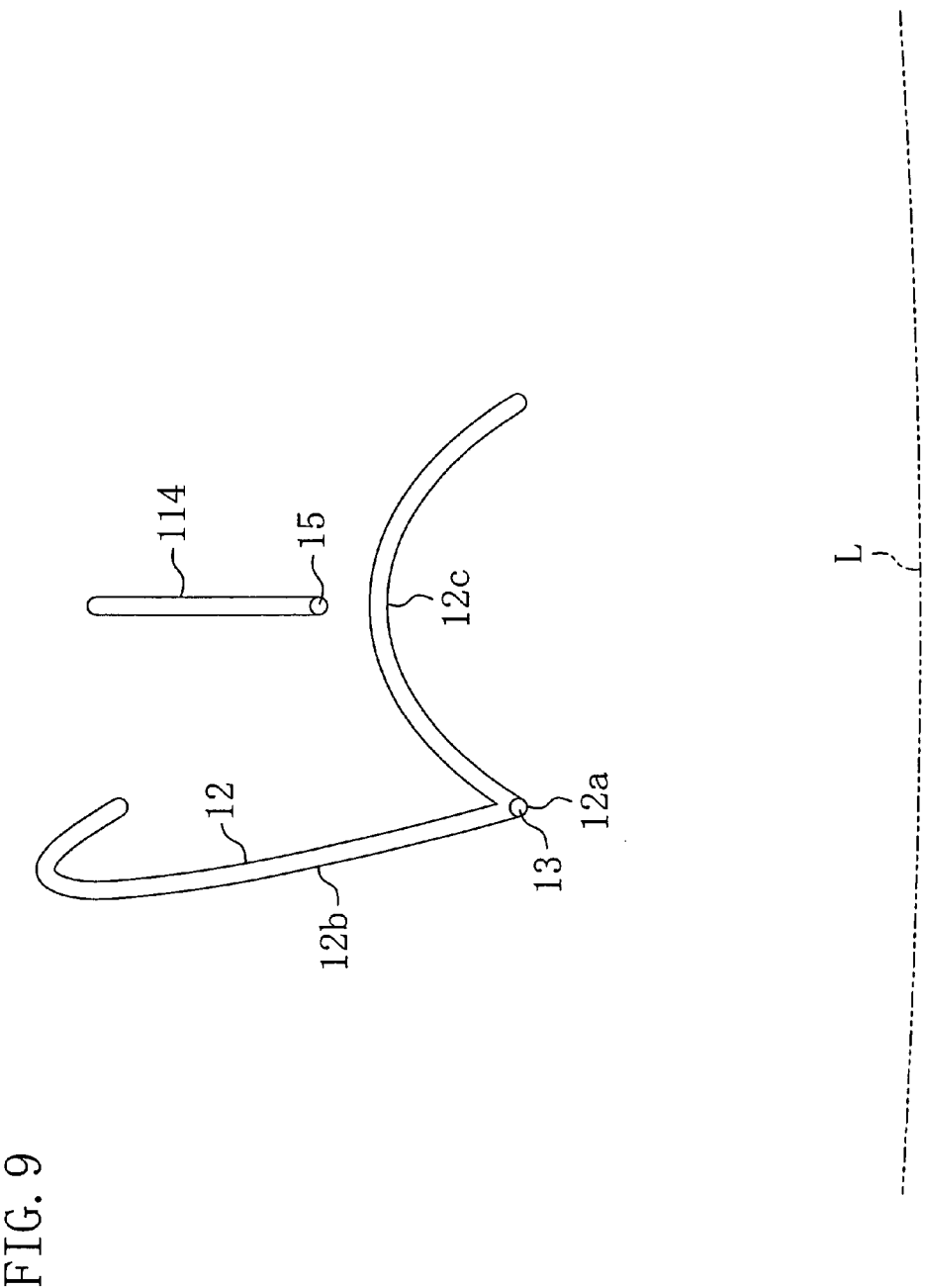
FIG. 9 is a front view showing the shapes of first and second guide grooves in a folding portable communications device according to another embodiment of the present invention.

The shapes of the first and second guide grooves 12 and 14 are not limited to those in the above embodiment. Although in the above embodiment the second guide groove extends in a direction inclined with respect to an axial direction of the hinge 6, it may extend in a direction orthogonal to the axial direction of the hinge 6 as shown in FIG. 9. In this case, the left section 12b can be formed in the shape of a hook whose top is gently bent to the right and the right section 12c can be formed in an upcurved shape. The path L of the lower right and left corners 2b and 2c during turning is shown in the dash-double-dot line in FIG. 9. Although not shown, the path may be a curve. Also in the case of FIG. 9, the liquid crystal display part 2 is guided and supported by the cam mechanism so that the lowermost end of the lower right corner 2b or the lower left corner 2c moves keeping a distance from the hinge 6. In other words, if the shapes of the first and second guide grooves 12 and 114 are appropriately selected, the desired movement of the liquid crystal display part 2 can be easily attained.

In the first-mentioned embodiment, the cam mechanism 10 guides and supports the liquid crystal display part 2 so that the lower right corner 2b moves along the hinge 6 when the liquid crystal display part 2 is switched in position while turning clockwise and that the lower left corner 2c moves along the hinge 6 when the liquid crystal display part 2 is switched in position while turning counterclockwise. The paths of the lower corners 2b and 2c can be controlled by appropriately selecting the shapes of the first and second guide grooves 12 and 14 and may be linear or curved. Such control makes it possible, for example, to place a camera or other components in the swelled part at the lower end of the first housing 3. Also in this case, the lower right and left corners 2b and 2c of the liquid crystal display part 2 can be prevented from coming into contact with the swelled part.

Although in the first-mentioned embodiment the first and second torsion coil springs 20 and 22 are disposed to urge the liquid crystal display part 2 both when changed into the vertical position and when changed into the horizontal position, the torsion coil springs 20 and 22 may be disposed to urge the liquid crystal display part 2 preferentially when changed into the vertical position or preferentially when changed into the horizontal position. Furthermore, the resilient member may be composed of a plurality of leaf springs or compression coil springs.

Although in the first-mentioned embodiment the lateral middles of the liquid crystal display part 2 in the vertical and horizontal positions are located substantially in the lateral middle of the first housing 3, they may be offset to the right or left.

Although in the first-mentioned embodiment the liquid crystal display part 2 serving as a display part includes a liquid crystal display 2a, it may include an organic EL display instead. The organic EL display needs little electricity to work because of self-emission of light, has a wider angle of visibility than the liquid crystal display and can be thinned because of no need for backlighting. On the other hand, the liquid crystal display 2a can be produced at lower cost and has a longer life than the organic EL display. The back liquid crystal display 11 may also be composed of an organic EL display.

Although in the first-mentioned embodiment the folding portable communications device is a mobile phone, it may be PHS, PDA, game consoles having communication facility or other communications tools.

The above embodiments are merely illustrative in nature and are not intended to limit the scope, applications and use of the invention.

What is claimed is:

1. A folding portable communications device including: a first housing including a display part provided at a surface thereof; a second housing including an operating part provided at a surface thereof; and a hinge connecting the first and second housings to allow the first and second housings to be freely opened and closed in their folded form; the display part being supported to the first housing through a support mechanism switchably between a vertical position and a horizontal position, wherein
   the support mechanism comprises a cam mechanism,
   the cam mechanism includes a first guide groove formed in the first housing and including continuous left and right sections, a second guide groove formed in the first housing away from the first guide groove, a first guide pin disposed on the back face of the display part to slidingly engage in the first guide groove, and a second guide pin disposed on the back face of the display part to slidingly engage in the second guide groove,
   the cam mechanism supports the display part to allow the display part to turn both clockwise and counterclockwise as viewed from the front to convert from the vertical position to the horizontal position and to convert from the horizontal position to the vertical position so that a lower corner of the display part keeps a distance from the hinge during turning so that the display part does not come into contact with the hinge,
   the cam mechanism includes a resilient member fixed at one end to the first guide pin, fixed at the other end to the first housing and urging the display part into at least one of the vertical and horizontal positions, and
   the resilient member comprises:
   a first resilient member acting on the first guide groove when the first guide pin is in the left section of the first guide groove; and
   a second resilient member acting on the first guide groove when the first guide pin is in the right section of the first guide groove.

2. The folding portable communications device of claim 1, wherein the cam mechanism is configured to guide and support the display part to allow the display part to switch between the vertical position and the horizontal position so that a lower right corner of the display part moves along the hinge at the distance when the display part is switched in position while turning clockwise as viewed from the front and that a lower left corner of the display part moves along the hinge at the distance when the display part is switched in position while turning counterclockwise as viewed from the front.

3. The folding portable communications device of claim 1, wherein the lateral middles of the display part in the vertical and horizontal positions are each located substantially in the lateral middle of the first housing.

4. The folding portable communications device of claim 1, wherein the resilient members are torsion coil springs.

5. The folding portable communications device of claim 4, wherein one ends of the first and second resilient members towards the first guide pin are formed in a substantially U-shape.

6. The folding portable communications device of claim 1, wherein the second guide groove extends in a direction inclining with respect to the axis of the hinge.

7. The folding portable communications device of claim 1, wherein the second guide groove extends substantially orthogonally to the axis of the hinge.

8. The folding portable communications device of claim 1, wherein the second guide groove has a curved shape.

9. The folding portable communications device of claim 1, configured to be put on a place with the first housing opened from the second housing and the second housing resting on the place whether the display part is in the vertical position or in the horizontal position.

10. The folding portable communications device of claim 1, wherein the folding, portable communications device is a mobile phone.

* * * * *